Figure 3:
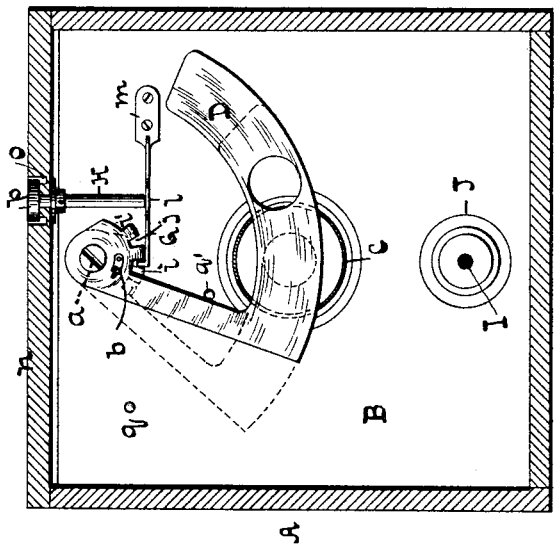

(No Model.)  2 Sheets—Sheet 1.
W. H. BRISTOL.
CAMERA SHUTTER.
No. 481,343.  Patented Aug. 23, 1892.
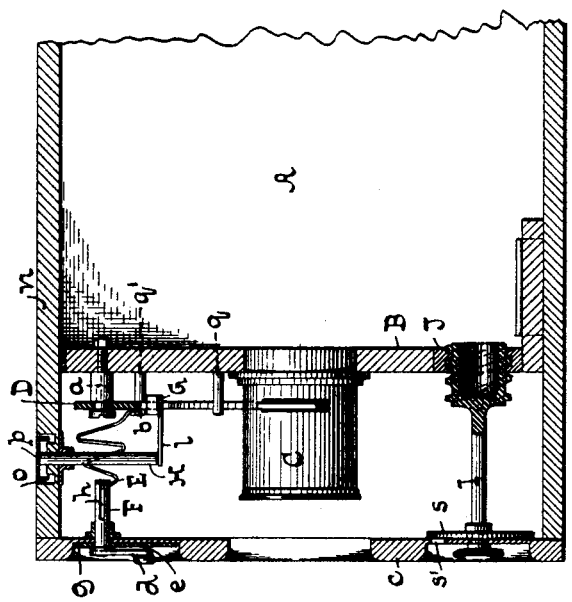
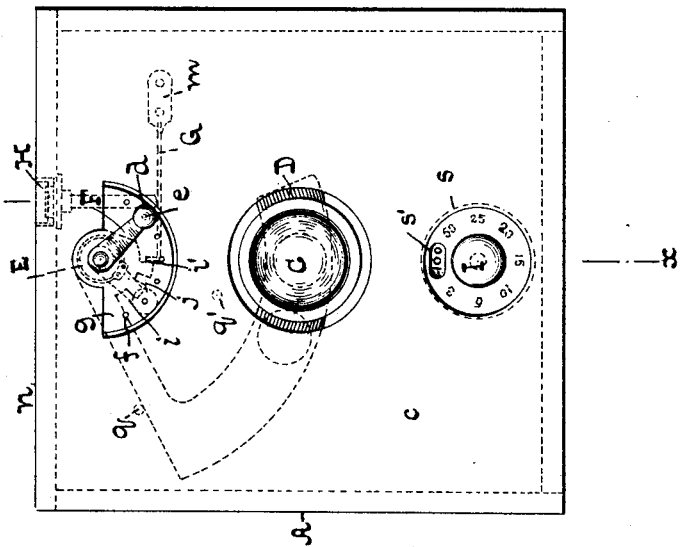
WITNESSES:
INVENTOR:
William H. Bristol,
BY
ATTORNEY
THE NORRIS PETERS CO., PHOTO-LITHO., WASHINGTON, D. C.

(No Model.)

W. H. BRISTOL.
CAMERA SHUTTER.

No. 481,343.

2 Sheets—Sheet 2.

Patented Aug. 23, 1892.

WITNESSES:

INVENTOR:
William H. Bristol,
BY A. Faber du Faur Jr.
ATTORNEY.

UNITED STATES PATENT OFFICE.

WILLIAM H. BRISTOL, OF HOBOKEN, NEW JERSEY.

CAMERA-SHUTTER.

SPECIFICATION forming part of Letters Patent No. 481,343, dated August 23, 1892.

Application filed March 2, 1892. Serial No. 423,478. (No model.)

*To all whom it may concern:*

Be it known that I, WILLIAM H. BRISTOL, a citizen of the United States of America, residing at Hoboken, in the county of Hudson and State of New Jersey, have invented certain new and useful Improvements in Shutters for Photographic Cameras, of which the following is a specification.

My invention has reference to photographic cameras, and especially to shutters for instantaneous exposures of that class which are actuated in both directions by spring-pressure.

It has for its object to simplify the mechanism and to render the operation of the shutter more reliable than heretofore.

To this end my invention consists, essentially, in the combination, in a camera-shutter, of a pivoted shutter, a movable support therefor, a spring made fast at one end to the shutter, an energizing-key arranged in line with the spring and having the end opposite the spring slotted to receive the free end of the spring, a detent engaging with the shutter, and a releasing device adapted to free the shutter from the detent, all of which is more fully pointed out in the following specification and claim and illustrated in the accompanying drawings, in which—

Figure 1 represents a front elevation of a camera provided with my improvements. Fig. 2 is a vertical section in the plane *x x*, Fig. 1, part being broken away. Fig. 3 is a vertical section taken directly in front of the shutter and showing the same in a position different from that shown in Fig. 1.

Similar letters indicate corresponding parts throughout the several views.

In the drawings the letter A designates the box or case, B the lens-board and shutter-support, movable in suitable guides, and C the lens-tube, secured to the lens-board and provided with a transverse slot for the passage of the shutter D, all as usual in a well-known type of camera. The shutter D is pivoted at *a* to the support B, so as to swing freely about its pivot, the point of pivoting being preferably above the lens-tube. One end of a spiral spring E, arranged at right angles to the plane of the shutter and on a line with the pivot, is secured to the said shutter at *b*, while the opposite end of said spring is directly engaged by the shank of a key F, passing through the front *c* of the box or case. The key is provided with an arm or handle *d*, which has at its end an inwardly-projecting pin *e*, adapted to engage with a row of recesses *f* in a plate *g*, countersunk in and secured to the front *c*, Fig. 1.

To permit the lens-board to be adjusted for the purpose of focusing without causing undue strain on the head of the shutter-pivot or straining the spring too greatly, the connection between the spring E and the key F may be such as to permit the end of the spring to move in the shank of the key—for instance, by forming in the said shank a transverse slot *h*, Fig. 2, in which the end of the spring is inserted.

The shutter is provided near its point of pivot with two notches *i* and *i'*, arranged on opposite sides of a central notch *j*, all said notches being adapted to be entered by the nose of a spring-detent G. This detent is preferably made in the form of a flat spring, attached at *m* to the lens-board B, and is engaged to force it out of the notches in the shutter by a rod H, extending through the top *n* of the box or case. The spring may be made wide enough or provided with a lateral extension *l* in order that the releasing-rod H may always remain in contact with the same during focusing.

To prevent light from entering the camera about the rod H, an annular groove *o* is made in the top at this point, and the head *p* of the rod is made cup-shaped and fitted into the said groove.

For limiting the motion of the shutter when propelled by the spring suitable stops, as *q q'*, may be used, the latter being preferably covered with elastic material to lessen the shock.

The operation of the device is as follows: In Fig. 1 the shutter is shown in its extreme left-hand position and the detent G is in engagement with the recess *i'*. If now the key F is turned to the right and held in this position by the pin *e* and one of the recesses *f* in plate *g*, the spring E is energized and a tension is exerted upon the shutter tending to propel the same toward the right, which motion of the shutter is prevented by the detent G. This tension of course varies with the angle through which the key is turned, and therefore the rapidity of motion of the shutter, and consequently the time of exposure, can be regulated. The shutter when released by depressing the releasing-rod H is moved to the right until it is arrested by the stop $q'$, in which position it is shown by full lines in Fig. 3. In this position of the shutter the recess $i$ is engaged by the detent G. If the key F is now turned to the left, the spring will again be energized; but its tendency is now to force the shutter to the left. The depression of the releasing-rod permits the shutter to be propelled in this direction.

For time-exposures the shutter is set to its central position, where it is held by the notch $j$ being brought opposite to the detent. (See dotted lines in Fig. 3.)

For focusing I make use of a screw-spindle I, which engages with a nut J, secured in the lens-board B. The pitch of the screw is made such that one turn of the spindle will move the lens-board from one extreme position to the other. On the spindle is mounted a dial-plate $s$, containing the numerals indicating the distances, said dial-plate being arranged opposite an opening $s'$ of sufficient size to permit one number at a time to be seen. By bringing the distance-number opposite the opening the corresponding focal distance is obtained.

What I claim as new, and desire to secure by Letters Patent, is—

In a camera-shutter, the combination of a pivoted shutter, a movable support therefor, a spring made fast at one end to the shutter, an energizing-key arranged in line with the spring and having the end opposite the spring slotted to receive the free end of the spring, and a detent and releasing device, substantially as described.

In testimony that I claim the foregoing as my invention I have signed my name, in the presence of two witnesses, this 29th day of February, 1892.

WILLIAM H. BRISTOL.

Witnesses:
KLAS H. TERNSTEDT,
JOSEPH MALLE.